United States Patent
Kuo et al.

(10) Patent No.: US 7,421,180 B2
(45) Date of Patent: Sep. 2, 2008

(54) LIGHT GUIDE APPARATUS FOR USE IN REAR PROJECTION DISPLAY ENVIRONMENTS

(75) Inventors: Huei Pei Kuo, Cupertino, CA (US); Laurence M. Hubby, Jr., Palo Alto, CA (US); Steven L. Naberhuis, Fremont, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 697 days.

(21) Appl. No.: 10/698,829

(22) Filed: Oct. 31, 2003

(65) Prior Publication Data

US 2005/0093814 A1 May 5, 2005

(51) Int. Cl.
G02B 6/00 (2006.01)
(52) U.S. Cl. .................................................. 385/133
(58) Field of Classification Search ............ 385/2, 385/133
See application file for complete search history.

(56) References Cited

U.S. PATENT DOCUMENTS

| | | | |
|---|---|---|---|
| 3,042,910 A | 7/1962 | Hicks | |
| 4,003,080 A * | 1/1977 | Maiman et al. | 348/196 |
| 4,090,104 A | 5/1978 | Vann et al. | |
| 4,116,739 A | 9/1978 | Glenn | |
| 4,208,096 A | 6/1980 | Glenn, Jr. | |
| 4,417,412 A | 11/1983 | Sansom | |
| 4,693,552 A | 9/1987 | Jeskey | |
| 4,929,048 A | 5/1990 | Cuypers | |
| 5,381,502 A | 1/1995 | Veligdan | |
| 5,481,385 A | 1/1996 | Zimmerman et al. | |
| 5,508,892 A | 4/1996 | Laczynski et al. | |
| 5,684,905 A | 11/1997 | Sugawara et al. | |
| 5,862,285 A * | 1/1999 | Danielian et al. | 385/121 |
| 5,911,024 A | 6/1999 | Wallace | |
| 6,031,954 A * | 2/2000 | Higuchi | 385/120 |
| 6,144,791 A | 11/2000 | Wach et al. | |
| 6,195,016 B1 | 2/2001 | Shankle et al. | |
| 6,208,788 B1 | 3/2001 | Nosov | |
| 6,224,216 B1 * | 5/2001 | Parker et al. | 353/31 |
| 6,236,792 B1 | 5/2001 | Roach et al. | |
| 6,385,371 B1 * | 5/2002 | Li | 385/43 |
| 6,418,254 B1 | 7/2002 | Shikata et al. | |
| 6,571,043 B1 | 5/2003 | Lowry et al. | |
| 2004/0001679 A1 * | 1/2004 | Sisodia et al. | 385/120 |
| 2005/0243415 A1 * | 11/2005 | Lowe et al. | 359/443 |

* cited by examiner

*Primary Examiner*—Frank G Font
*Assistant Examiner*—Eric Wong

(57) ABSTRACT

A display apparatus comprising a plurality of light guides and method for producing such an apparatus is disclosed. The display apparatus comprises a plurality of substantially totally internally reflecting (TIR) light guides fashioned to expand a small original optical representation from an input of each light guide to a larger optical representation output at an output of each light guide. Each of the plurality of substantially totally internally reflecting light guides is separated from other substantially totally internally reflecting light guides by a material having a lower refraction index than the core material.

26 Claims, 3 Drawing Sheets

LIGHT GUIDE APPARATUS FOR USE IN REAR PROJECTION DISPLAY ENVIRONMENTS

BACKGROUND OF THE INVENTION

1. Field of the Invention

The present invention relates generally to the field of display devices, and more particularly to screens and related hardware employed in rear projection display type environments.

2. Description of the Related Art

Current rear projection display devices typically employ a wide angle projection lens operating in connection with a series of reflective surfaces, such as mirrors, to direct light received from the wide angle projection lens to the back of the screen. This lens-mirror projection arrangement enlarges the image received at the wide angle projection lens. Such a rear projection display arrangement typically exhibits a width or thickness in the range of approximately 30-60 centimeters, and a weight in the range of approximately 10 to 50 kilograms for a large screen rear projection television type display where the screen diagonal is typically in the range of approximately 75 to 150 centimeters. In many environments, such a rear projection display device may be exposed to various adverse conditions, not the least of which is wear and tear in an active environment.

Certain rear projection display devices exhibit average or below average picture quality in certain environments. For example, such devices can be difficult to see when viewed from particular angles or when light varies within the environment or reaches extreme intensities in the environment. Light output and contrast is a constant issue in these types of environments and can negatively impact the viewing experience. Viewers are also becoming accustomed to enhanced types of displays, including but not limited to plasma displays or liquid crystal displays (LCDs), which can be more appealing than the traditional rear projection display but tend to cost significantly more. To address and improve rear projection quality in the mind of the more sophisticated consumer, certain enhanced lensing has been employed in the rear projection display system, but the aforementioned basic lens/reflector design remains generally intact and tends to be a limiting factor in overall picture quality and overall system thickness.

Specific examples of prior devices incorporating light guides to provide such attributes includes U.S. Pat. No. 4,116,739 to Glenn, entitled "Method of Forming an Optical Fiber Device", and U.S. Pat. No. 5,381,502 entitled to Veligdan, entitled "Flat or Curved Thin Optical Display Panel." The optical fiber device of U.S. Pat. No. 4,116,739 can be prohibitively expensive to make for use in the large screens for use in the home television market. The display panel of U.S. Pat. No. 5,381,502 suffers from an optical effect known as "keystoning" unless the projection system is significantly far from the input surface of the panel, which can be undesirable. An unacceptable image can result from a reasonably compact display panel and projection optics combination.

Weight, thickness, durability, cost, and quality are key considerations for rear projection television displays and display screens. It would be advantageous to offer a rear projection design that is lighter, thinner, less expensive, and offers an enhanced viewing experience over previous rear projection designs.

SUMMARY OF THE INVENTION

According to a first aspect of the present design, there is provided a display apparatus. The display apparatus comprises a plurality of substantially totally internally reflecting (TIR) light guides for expanding a small original optical representation from an input of each light guide to a larger optical representation output at an output of each light guide.

According to a second aspect of the present design, there is provided a method for producing a display apparatus. The method comprises providing a layer of light guide material, placing a layer of material of lower index of refraction on the light guide material, alternately depositing a predetermined quantity of additional layers of light guide material and additional layers of material of lower index of refraction atop the light guide material to form a layered laminated stack, and cutting channels into the layered laminated stack, thereby creating a plurality of substantially totally internally reflecting (TIR) light guides.

According to a third aspect of the present design, there is provided an apparatus for providing light to a display. The apparatus comprises a plurality of substantially totally internally reflecting (TIR) light guides oriented to expand a relatively small original optical representation from an input of each light guide to a relatively large optical representation output at an output of each light guide. Each of the plurality of substantially totally internally reflecting light guides is separated from other substantially totally internally reflecting light guides by a material having lower refraction index than each substantially totally internally reflecting light guide.

These and other objects and advantages of all aspects of the present invention will become apparent to those skilled in the art after having read the following detailed disclosure of the preferred embodiments illustrated in the following drawings.

DESCRIPTION OF THE DRAWINGS

The present invention is illustrated by way of example, and not by way of limitation, in the figures of the accompanying drawings in which.

DETAILED DESCRIPTION OF THE INVENTION

The present invention is generally applicable to a number of different screen assemblies and is particularly suited to screen assemblies used in rear projection systems. While specific examples of such screen assemblies are provided herein to facilitate explanation and understanding of various aspects of the invention, the description provided and the invention itself is not intended to be limited to the specifics of the examples.

Figure 1:
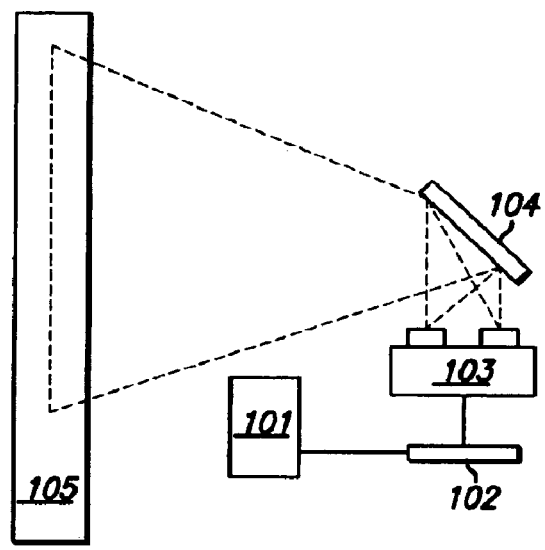
FIG. 1 illustrates a typical prior art rear projection design.

FIG. 1 illustrates a typical design of previous rear projection designs, including source 101, which may provide analog or digital signals in the form of bits, individual pixels, entire images, or other applicable input forms. The input form may be converted to an overall image by converter 102, which typically takes digital signals and converts them to analog, or receives television signals and converts them to an image or images. Converter 102 is a generic representation of a device that receives input signals in a particular format and converts those signals into an image or series of images. Wide angle projection lenses 103 receive the converted images and transmit them to a series of reflective surfaces 104, and to a screen 105. Multiple wide angle projection lenses may be employed, such as three or multiples of three for the red, green, and blue aspects of the display. Note that from the side view presented in FIG. 1, only one of the reflective surfaces 104 is apparent. More than one reflective surface may be employed.

Figure 2:
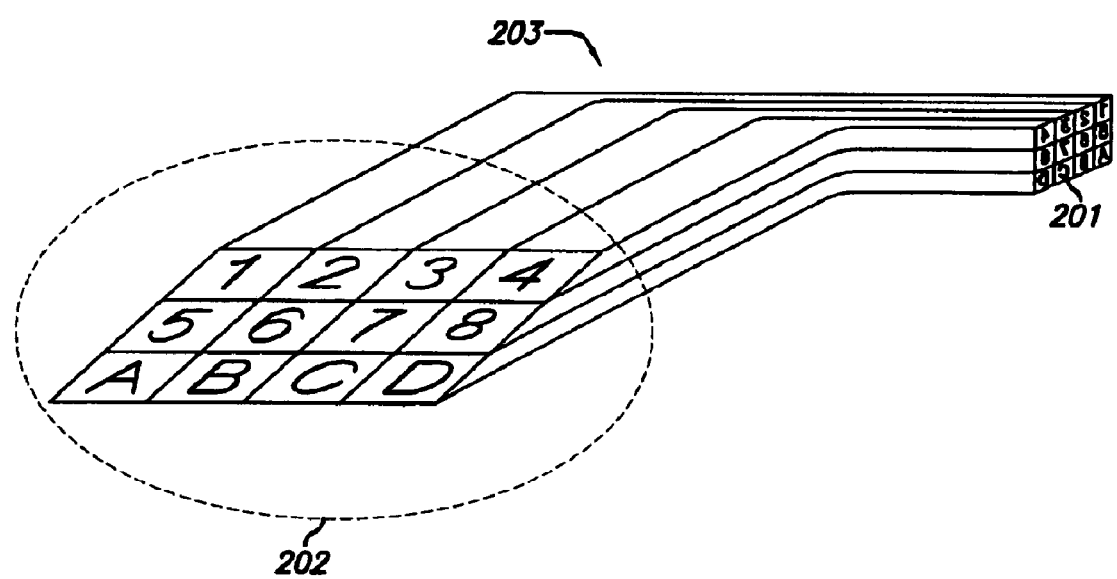
FIG. 2 shows a conceptual, theoretical representation of a light guide design for illustrative purposes, where an actual light guide would have a curvature or bend with a radius of curvature at least ten times the width of the input side of the light guide.

The present design is directed to a screen fabricated using a series of light guides made from patterned layers of plastics, used to transmit pixels from a source or input to the display or display screen. FIG. 2 a conceptual, theoretical representation of a light guide design for illustrating the elements of the light guide and not a specific design thereof. Input location 201 receives pixels, image portions, or light energy at a series of points or input locations for individual light guides 203, such as at the individual squares labeled as 1-8 and A-D in FIG. 2. Other light guide geometries could be employed, including but not limited to triangular, rectangular, and hexagonal. Output location 202 may employ a bevel cut to form an enlarged view of the received input image. Angle of beveling is variable, and in the embodiment shown may be on the order of approximately less than ten degrees. As may be appreciated, the larger the bevel angle, the less area the light guide may occupy and/or display on the screen. Magnification in the direction orthogonal to the bevel is accomplished by adjusting the spacing between adjacent light guides. Magnification in this arrangement equals the ratio of the inter-guide spacing of the output end to the input end. The magnification in the central region could potentially differ from the magnification of the peripheral region.

Figure 3:
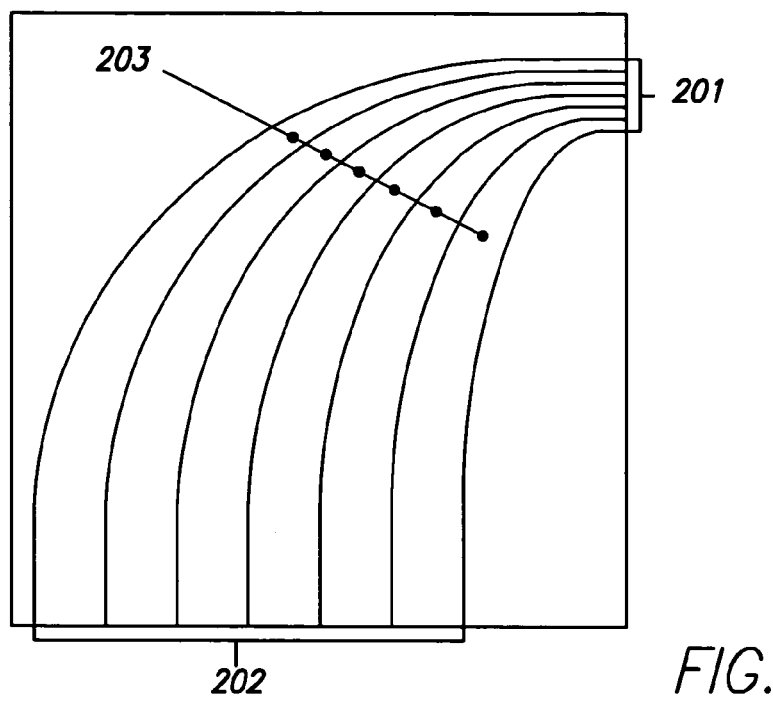
FIG. 3 illustrates an alternative embodiment of the light guide design using gentle curvatures to provide the signal displayed using total internal reflection (TIR)

The illustration presented in FIG. 2 generally shows a relatively severe 90 degree curvature of all light guides 203 in addition to beveling of the ends of the light guides for purposes of displaying the received input signals. In practice, such a bend may have a radius of curvature in the range of at least approximately ten times the width of the input side of any given light guide. While not required to be at the approximately 90 degree angle shown, the design does employ a bending or turning of the light guides 203 to provide enhanced size at the output location 202. FIG. 3 illustrates an embodiment of a light guide design having a more gentle curve, again resulting in a difference of 90 degrees in angle from the input received. As may be appreciated, the overall length of the light guides 203 may be extended linearly by placing light guide extensions on the input location 201 or output location 202, or otherwise altered to enable various light guide geometries for transmission of light signals from the source and input location 201 to the output location 202 and display or display screen.

The curvature, bending, or differential between the input and output of the light guide may differ depending on the medium employed to construct the light guides and/or clad material, the application, the bevel, if any, on the light guide output, and various other factors. The critical parameter is that the system and design provide light guides that are substantially totally internally reflecting, or TIR, discussed below, such that light received at the input location 201 of each light guide is substantially delivered to the output location 202 of said light guide with minimal loss.

As may be appreciated, significantly more than the twelve light guides illustrated in FIG. 2 may be employed to realize a full television type display, particularly when one pixel of a high definition image is represented by each light guide. Hundreds, thousands, or even more light guides 203 may be employed in conjunction with a single display. The output location 202 may form part of the screen, or another screen may be employed such that the output location is not exposed to the exterior of the device.

Figure 4:
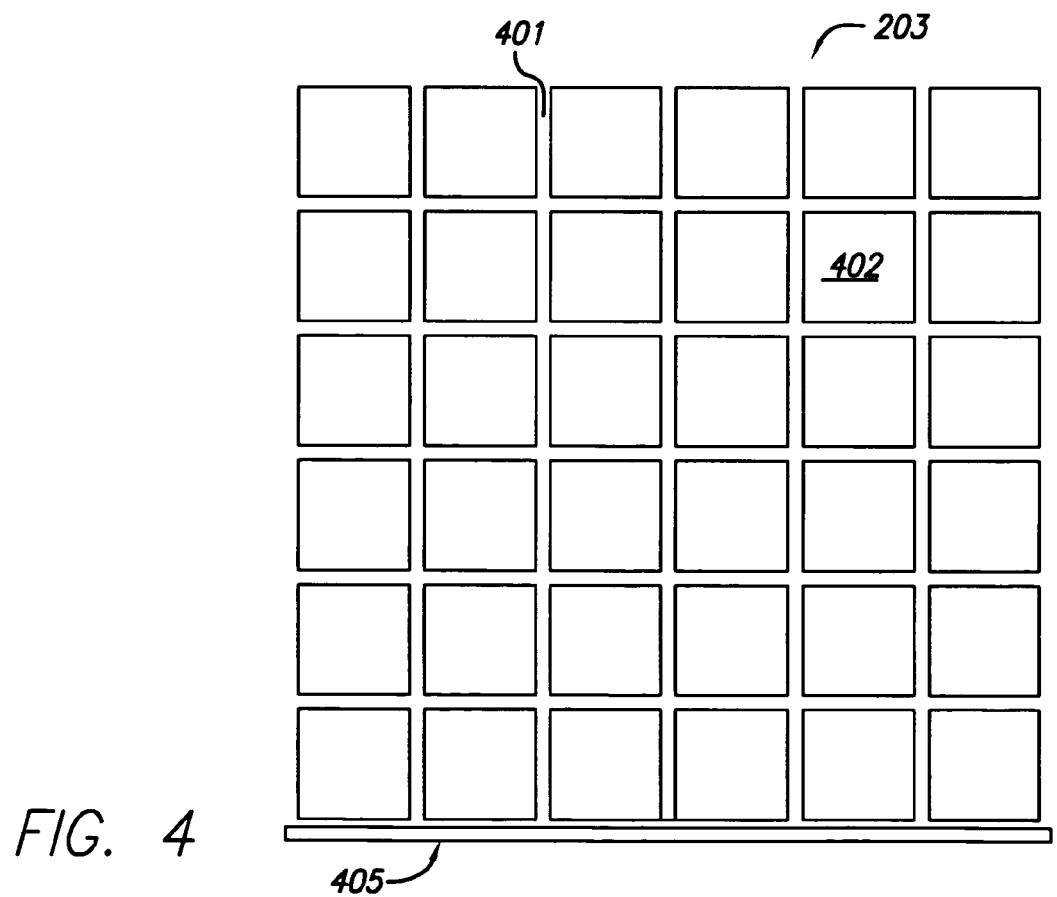
FIG. 4 shows cross sections of clad material, core material, and the optional substrate.

Construction of the light guides and the associated elements may differ depending on circumstances. In the embodiment shown, a sheet of individual light guide cores may be formed of a generally optically clear plastic or plastic type material, including but not limited to a plastic such as acrylic, plexiglas, or a polycarbonate material. The light guide core material may provide a low level of birefringence depending on the environment in which it is employed. The material used to construct the light guide may or may not be polarized, as the presence or absence of polarization may benefit particular designs. Acrylic sheets may be provided and layered on the substrate, which may be any type of substrate that is suitable for supporting and affixing to acrylic or other plastic material employed as the core material. The plastic or plastic type material forming the light guide core 402 may be formed on the optional substrate 405, as shown in FIG. 4, through embossing, silk screening, inkjet printing, laser cutting, or other available techniques. The light guides 203 may employ a material such as a clad material 401 having a refractive index lower than that of the core 402 to separate the individual light guides, with cross sections of these individual elements as shown in FIG. 4. The clad material 401 may be, for example, glue or some other type of bonding agent having a relatively low refractive index as compared to the core 402. Such a glue or bonding agent may be formed from a vulcanizing bonding agent or silicon glue, such as those available from General Electric Corporation or Dow Corning Corporation. Note that clad material may surround all light guide cores such as light guide core 402, or may be distributed in some other manner, such as a layer of clad material, for example a layer of glue, located between every horizontal layer of light guides. A different clad material may be provided in the vertical separations, such as air, or a vacuum, or other appropriate material. Different clad material arrangements may be employed, including but not limited to using more than one or two clad materials to separate the individual light guides.

As the name implies, the optional substrate 405 may or may not be employed. If the optional substrate is not employed, light guides form the bottom horizontal layer and are formed of the core material. More than one core material may be employed for the light guides 203. Light guides 203 that may be formed from a layered material may have each layer segmented to form light guides as shown in FIG. 2. The light guides are optically isolated from one another using the clad material 401 or air. The clad material 401 provides the ability to trap the light energy and provide, in certain geometries, total internal reflection, or TIR.

Total internal reflection (TIR) is the reflection of all the incident light off the boundary. TIR only occurs when both a light ray is in a more dense medium and approaches a less dense medium, and the angle of incidence for the light ray is greater than the "critical angle." Critical angle is defined as the angle of incidence which provides an exit angle of refraction of 90 degrees when the light impinges on the boundary from the side of the denser medium. For any angle of incidence greater than the critical angle, light being transmitted through the denser medium will undergo total internal reflection. The value of the critical angle depends upon the combination of materials present on each side of the boundary.

For an incidence medium and a refractive medium, such as the light guide material and the clad material, respectively, of the design presented, the critical angle is the angle of incidence of the incidence medium $\Theta_i$ that gives an angle of incidence of the refractive medium $\Theta_r$ of 90 degrees. Generally, the critical angle equals the inverse sine of the ratio of the indices of refraction, or:

$$\Theta = \sin^{-1}(n_r/n_i) \quad (1)$$

where $n_r$ and $n_i$ are the indices of refraction for the refractive material and the incidence material, respectively. Since TIR only occurs if the refractive medium is less dense than the incidence medium, the value of $n_i$ must be greater than the value of $n_r$. In the present design, the refractive index for the light guide material must be greater than the refractive index for the clad material. In the present design, internal scatter level is minimized, in both the horizontal and vertical direction.

Formation of the light guide may occur by providing an optional initial layer or substrate, affixing either clad material or a sheet of light guide material to the optional initial layer, and then alternately layering a sheet of light guide material and clad material on top of the layers previously formed. Application of the light guide sheets may occur using heat or lamination techniques. The complete layered stack may then have channels carved therein, providing a series of channels that may contain only air, or alternately more clad material, or any material having an appropriate refractive index to provide the requisite TIR. The channels are typically not straight in orientation, but instead may provide a non-insubstantial angle between input and output ends, including possibly an angular difference of greater than 45 degrees or approximately 90 degrees. More than one bend or redirection may be provided between the input and output using the channel cutting discussed. At least one of the ends of the light guide array so formed may have a bevel cut to the approximately less than ten degree angle discussed.

In forming the layers of clad material and core material, or light guide material, the clad material generally cannot dissolve the core material. In the event the clad material, such as an active glue or bonding agent, dissolves the core material, the reflection of the light in the light guides may be random or unpredictable, and TIR may not result.

The light guides at the input and output ends 201 and 202 are arranged to preserve the relative positions between pixels, such as a rectangular input being transmitted to a rectangular output having the same or similar aspect ratio. Aspect ratios of the input and output of the light guides may differ in certain circumstances. For example, an image projected on the input end of a light guide may be pixilated by the individual light guides and an enlarged pixilated image may result at the output of the light guides having a different aspect ratio, based on a different aspect ratio between the input and output end of the light guide. Magnifications in the horizontal direction may differ from magnifications in the vertical direction, particularly in the case of differing bevel angles for a geometry such as that shown in FIG. 2. The end result, or the output of the light guide transmitted to the screen, may produce an image having isotropic proportions when magnification differences and bevel angle are taken into account. From the representation of FIG. 2, the numbers and letters illustrated in the light guides 203 are used to indicate connections and identify individual light guides, and not to indicate image or pixel preservation or magnification/aspect ratio within each individual light guide.

In the case where multiple layers of core material are employed, each light guide may be separated from other light guides on each layer by an air gap. Further, the substrate for the light guides may be the clad material. In forming the entire light guide and display, multiple sheets may be laminated to form stacked layers. The multiple sheets may be formed of the core material, the clad material, and the substrate, or alternately by the core material and the clad material. In one embodiment, the number of layers, generally at a minimum, may equal the number of desired pixels in one direction on the display, either vertically or horizontally. Formation of individual light guides may be performed after several sheets of core material are laminated by, for example, laser cutting through the layers of laminated material.

Figure 5:
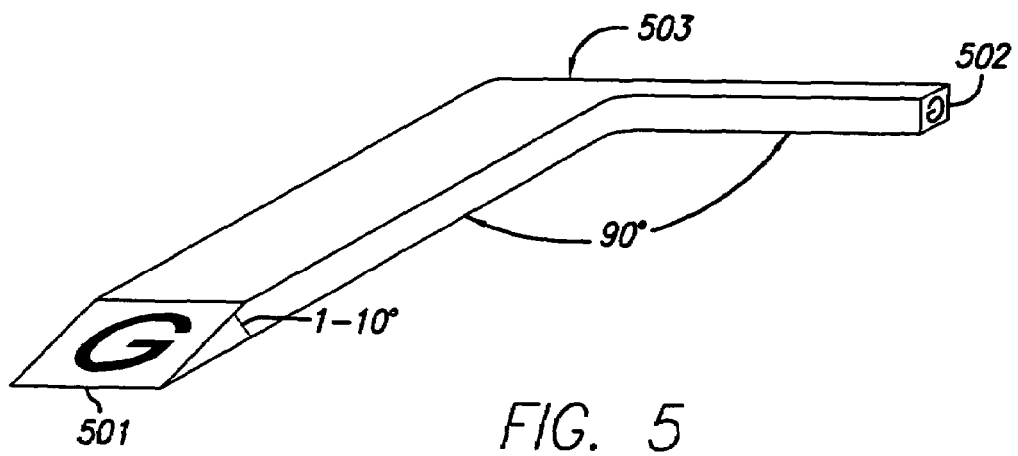
FIG. 5 shows construction of an individual light guide.

An example of an embodiment of an individual light guide is illustrated in FIG. 5. From FIG. 5, the width of the output 501 is larger than the input and can also be beveled to achieve appropriate magnification. Input 502 receives the image at a small size and transmits it through bend 503 to output 501, which is beveled to provide an approximate 5 to 50× magnification of the received image in the orientation shown. Depending on circumstances, such as available spacing, a linear magnification of approximately 5 to 50 may be employed. While a single 90 degree bend 503 is illustrated in FIG. 5, more than one bend may be employed in a single light guide depending on geometry desired.

Figure 6:
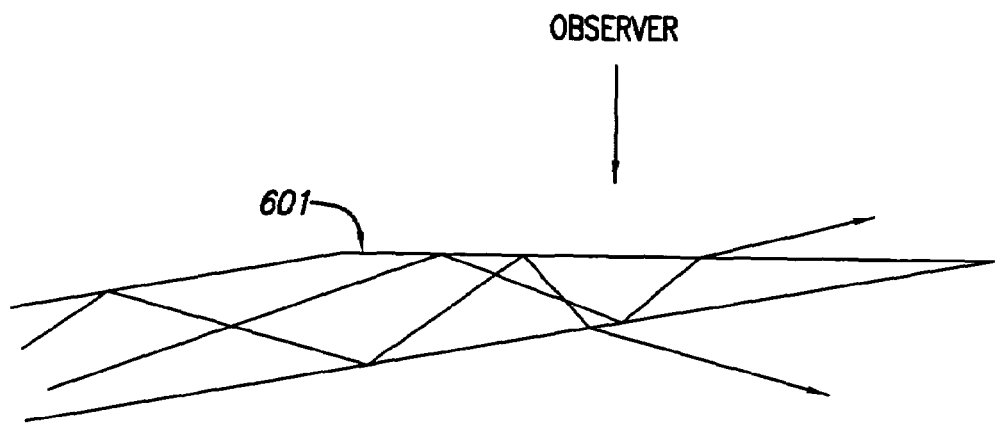
FIG. 6 illustrates light rays traveling through an individual light guide, generally with minimal loss and TIR.

Operation of the individual light guides uses internal reflection and may vary depending on the geometry presented. FIG. 6 illustrates light rays traveling through an individual light guide, generally with minimal loss and TIR. Light exits the beveled region of the output 601 after multiple reflections within the beveled region. The bevel at the output 601 reduces the internal angle of the light ray below the critical angle. Only a small fraction of the light in previous designs typically reaches the observer looking at the screen from a direction normal to the tapered end. In the present arrangement, a significant fraction of the light energy is directed toward the observer. From the design of FIG. 6, the bevel is approximately five degrees, and light exits the beveled end at an angle of less than approximately 25 degrees relative to the surface of the beveled output end.

Figure 7:
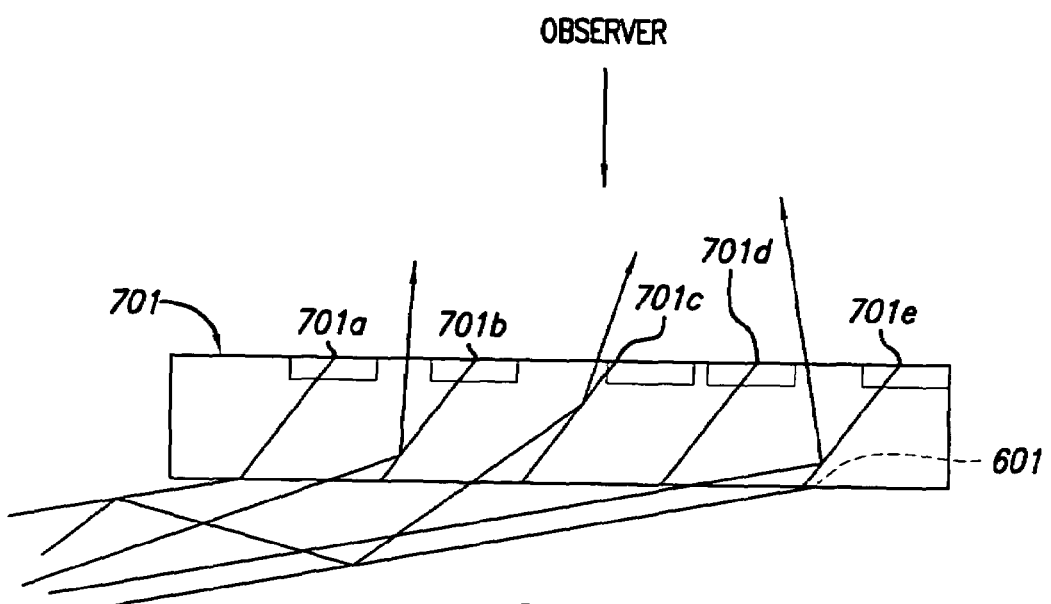
FIG. 7 illustrates a supplemental lens-reflection arrangement intended to redirect light emitted from the beveled region of the output of a light guide.

FIG. 7 illustrates a supplemental lens-reflector arrangement intended to redirect light emitted from the beveled region of the output 601. Reflective device 701 receives light reflected from the beveled end and employs a series of reflectors 701a-e that reflect light received from the beveled region or beveled surface of the output 601 of the light guide toward an observer or hypothetical observer. The design of FIG. 7 provides increased brightness of the display. Further, elimination of reflection at the output beveled end of the light guide by using reflective device 701 can, in certain orientations, prevent light from exiting the light guide at the side away from the observer or hypothetical observer. The slanted reflectors 701a-e trap ambient light and increase the contrast of the display. While the orientation angles of all reflectors 701a-e in FIG. 7 are identical, a reflective device 701 may be provided where the angle of each reflector is altered depending on the expected incidence angle of received light energy from the beveled output. This varied angle reflector design could provide better direction of light energy to the observer or hypothetical observer. Further, the reflector surfaces could be wavy or irregular at an interval much smaller than the size of a pixel. This wavy or irregular construction can produce a diffused rather than a specular reflection to increase the viewing angle.

The reflective device may be fabricated from the same core material as the light guides or from a material whose index of refraction substantially matches that of the core material as the light guides, with reflective surfaces fashioned therein. The reflective surfaces are comprised of a material that is substantially reflecting uniformly throughout the visible spectrum. Additionally, while straight reflective surfaces are shown in reflective device 701, curved reflectors, such as concave reflectors, may be employed to better capture and redirect light energy toward the observer or hypothetical observer.

Further, additional post output layers may be applied to the output surface of the beveled surface of the brightness enhancement layer, such as the reflective device 701, to increase scratch resistance and lengthen life of the screen. Such an additional layer or device may include, for example, a polycarbonate layer.

It will be appreciated to those of skill in the art that the present design may be applied to other systems that display static or dynamic images, such as computer displays, or other projection devices having small projected images that may be beneficially expanded into larger projected images with minimal loss of quality. In particular, it will be appreciated that various display and/or rear-projection display designs may be addressed by the functionality and associated aspects described herein.

Although there has been hereinabove described an apparatus and a method for projecting images onto a display using a series of light guides, for the purpose of illustrating the manner in which the invention may be used to advantage, it should be appreciated that the invention is not limited thereto. Accordingly, any and all modifications, variations, or equivalent arrangements which may occur to those skilled in the art, should be considered to be within the scope of the present invention as defined in the appended claims.

What is claimed is:

1. A display apparatus, comprising:
   a plurality of substantially totally internally reflecting (TIR) light guides for expanding a small original optical representation from an input of each light guide to a larger optical representation output at an output of each light guide, wherein the input of each light guide encompasses a relatively smaller cross-sectional area as compared with a cross-sectional area of the output taken perpendicularly with respect to a length of each light guide, wherein the cross-sectional area at the input or each light guide is formed of n first dimension and a second dimension and wherein the cross-sectional area of the output of each light guide is formed of a third dimension and a fourth dimension, and wherein the third dimension is equal to the first dimension and the fourth dimension is larger than the second dimension.

2. The display apparatus of claim 1, wherein each of said plurality of substantially totally internally reflecting light guides is formed from a light guide material, and further wherein each of said plurality of substantially totally internally reflecting light guides is separated from other substantially totally internally reflecting light guides by a material of lower index of refraction than the light guide material.

3. The display apparatus of claim 1, wherein said plurality of substantially totally internally reflecting light guides comprises a bend along lengths of the plurality of substantially totally internally reflective light guides.

4. The display apparatus of claim 1, wherein said original optical representation comprises a pixel of an image.

5. The display apparatus of claim 1, wherein the output of each substantially totally internally reflecting light guide comprises a beveled surface, wherein the beveled surface is configured to cause the larger optical representation output to have the same aspect ratio as the small original optical representation.

6. The display apparatus of claim 5, further comprising a reflecting element located proximate to and coupled optically with, through the use of transparent material with similar index of refraction as the light guide, the beveled surface, the reflecting element comprising at least one reflector oriented to receive light energy from said beveled surface and reorient the light energy to an angle substantially more perpendicular to the beveled surface.

7. The display apparatus of claim 6, wherein the reflecting element comprises a plurality of reflectors oriented to receive multiple light beams from the beveled surface and reflect the multiple light beams at predetermined angles.

8. The display apparatus of claim 7, wherein the plurality of elements in the reflecting element prevent light from exiting the light guide at a side away from the beveled surface.

9. The display apparatus of claim 7, wherein the plurality of elements in the reflecting element trap ambient light, thereby enhancing contrast of the display apparatus.

10. The display apparatus of claim 6, wherein the output face of the reflecting clement is coated with material to enhance durability and structured to enhance viewing.

11. The display apparatus of claim 7, wherein the output face of the reflecting element is coated with material to enhance durability and structured to enhance viewing.

12. The display apparatus of claim 1, wherein each substantially totally internally reflecting light guide comprises plastic.

13. The display apparatus of claim 1, wherein each substantially totally internally reflecting light guide comprises acrylic.

14. The display apparatus of claim 2, wherein the material of lower index of refraction comprises air.

15. The display apparatus of claim 2, wherein the material of lower index of refraction comprises glue.

16. An apparatus for providing light to a display, comprising:
   a plurality of substantially totally internally reflecting (TIR) light guides oriented to expand a relatively small original optical representation from an input of each light guide to a relatively large optical representation output at an output of each light guide, wherein the input of each light guide encompasses a relatively smaller cross-sectional area as compared with a cross-sectional area of the output taken perpendicularly with respect to a length of each light guide, wherein the cross-sectional area at the input of each light guide is formed of a first dimension and a second dimension and wherein the cross-sectional area of the output of each light guide is formed of a third dimension and fourth dimension, and wherein the third dimension is equal to the first dimension and the fourth dimension is larger than the second dimension;
   wherein each of said plurality of substantially totally internally reflecting light guides is separated from other substantially totally internally reflecting light guides by a material having lower refraction index than each substantially totally internally reflecting light guide.

17. The apparatus of claim 16, wherein an aspect ratio for said relatively small original optical representation is substantially similar to an aspect ratio for said relatively large optical representation output.

18. The apparatus of claim 16, wherein the output of each substantially totally initially reflecting light guide comprises a beveled surface, wherein the beveled surface is configured to cause the larger optical representation output to have the same aspect ratio as the small original optical representation.

19. The apparatus of claim 18, further comprising a reflecting element located proximate to and coupled optically with, through the use of transparent material with similar index of refraction as the light guide, the beveled surface, the reflecting element comprising at least one reflector oriented to receive light energy from said beveled surface and reorient the light energy to an angle substantially more perpendicular to the beveled surface.

20. The apparatus of claim 19, further comprising a surface layer on the output face of the reflecting element to enhance durability and viewing.

21. The apparatus of claim 16, wherein each substantially totally internally reflecting light guide is formed of plastic.

22. The apparatus of claim 16, wherein the material having lower refraction index than each substantially totally internally reflecting light guide comprises air.

23. The apparatus of claim 16, wherein the material having lower refraction index than each substantially totally internally reflecting light guide comprises glue.

24. The apparatus of claim 19, wherein the reflecting element comprises a plurality of reflectors oriented to receive multiple light beams from the beveled surface and reflect the multiple light beams at predetermined angles.

25. The apparatus of claim 24, wherein the plurality of elements in the reflecting element prevent light from exiting the light guide at a side away from the beveled surface.

26. The apparatus of claim 24, wherein the plurality of elements in the reflecting element trap ambient light, thereby enhancing contrast of the apparatus.

\* \* \* \* \*

UNITED STATES PATENT AND TRADEMARK OFFICE
CERTIFICATE OF CORRECTION

| | | |
|---|---|---|
| PATENT NO. | : 7,421,180 B2 | Page 1 of 1 |
| APPLICATION NO. | : 10/698829 | |
| DATED | : September 2, 2008 | |
| INVENTOR(S) | : Huei Pei Kuo et al. | |

It is certified that error appears in the above-identified patent and that said Letters Patent is hereby corrected as shown below:

In column 5, line 15, delete " $\Theta = \sin^{-1}(n_r/n_i)$ " and insert -- $\Theta_i = \sin^{-1}(n_r/n_i)$ --, therefor.

In column 7, line 50, in Claim 1, after "input" delete "or" and insert -- of --, therefor.

In column 7, line 51, in Claim 1, after "of" delete "n" and insert -- a --, therefor.

In column 8, line 29, in Claim 10, delete "clement" and insert -- element --, therefor.

In column 8, line 59, in Claim 16, before "fourth" insert -- a --.

In column 9, line 6, in Claim 18, delete "initially" and insert -- internally --, therefor.

Signed and Sealed this

Thirtieth Day of December, 2008

JON W. DUDAS
*Director of the United States Patent and Trademark Office*